Oct. 30, 1928.
G. A. JUHLIN ET AL
1,689,877
MARINE PROPULSION
Filed Feb. 26, 1921
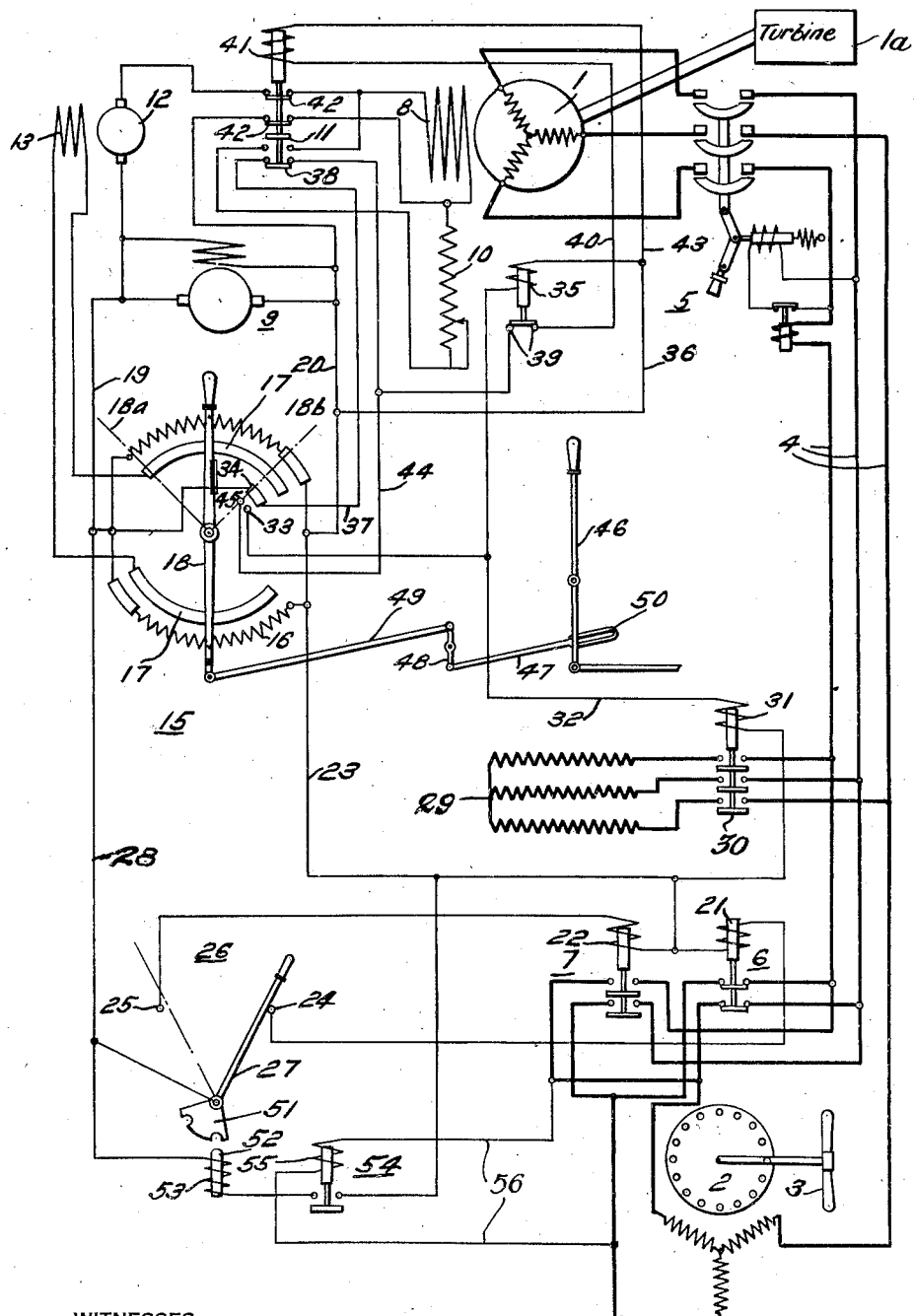
WITNESSES:
INVENTORS
Gustaf Adolf Juhlin &
Leonard Miller
BY
ATTORNEY Patented Oct. 30, 1928.

1,689,877

UNITED STATES PATENT OFFICE.

GUSTAF ADOLF JUHLIN, OF SALE, AND LEONARD MILLER, OF WHITEFIELD, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

MARINE PROPULSION.

Application filed February 26, 1921, Serial No. 448,275, and in Great Britain March 11, 1920.

Our invention relates to motor-control systems and it has particular relation to systems of control for motor-generator sets which are subjected to "overhauling" loads, such, for example, as ships that are electrically driven and are equipped with steam turbines for actuating the generators.

The object of the present invention is to provide improved arrangements for reversing the direction of rotation of a motor without reversing a steam turbine which drives a generator that supplies electrical energy to the motor.

Briefly speaking, our invention comprises providing a rheostat and a booster for governing the energization of the field-magnet winding of a turbine-driven generator and interlocking a lever that controls the steam admission valves of the turbine with the rheostat. The reversing switches for a propelling motor energized by the generator and dynamic braking switches for decreasing the speed of the generator are governed by the rheostat.

To enable the invention to be clearly understood, it will now be described with reference to the accompanying drawing which is an electrical diagram illustrating, by way of example, an arrangement for marine propulsion in accordance with the invention.

Referring to the drawing, 1 is the alternating-current electric generator driven by a steam turbine 1ª, 2 is the induction motor which preferably has two squirrel-cage windings in parallel with each other, 3 represents, conventionally, a ship's propeller driven by the motor 2. The latter is connected by leads 4 to the generator 1 through a circuit-breaker indicated at 5. Electrically operated reversing switches 6 and 7 are provided in the leads 4 for reversing the direction of rotation of the motor 2, as hereinafter more fully described. The generator 1 is provided with a main field winding 8 which is energized by a motor-driven exciter 9 and provided with an adjustable discharge resistance 10 adapted to be connected across the said field upon the closure of a contactor switch 11 which closes upon the opening of the switch 42, as hereinafter described. The voltage of the field winding 8 is controlled by means of a motor-driven booster of which the armature is indicated at 12 and the field winding at 13.

The booster field winding 13 is excited from the exciter 9 and the excitation is regulated by a reversing rheostat 15 comprising resistances 16 and segments 17 and a controlling lever 18. The exciting generator 9 is connected by leads 19 and 20 to the resistances 16, and the booster field winding 13 is connected to the segments 17 so that the voltage supplied to the booster field winding 13 may be varied from a maximum in one direction, when the controlling lever 18 is in the position shown in dotted lines 18ª, to a maximum in the opposite direction when the lever is in the dotted line position 18ᵇ.

In the normal operation of the generator 1, the controlling lever 18 is in the mid-position, as shown in full lines, and no current circulates in the booster field winding 13. The booster is so connected in the circuit of the generator field winding 8 that, when the controlling lever 18 is in the position 18ª, the field winding 8 is excited to its maximum, for example, to one and a half times it normal value for the purpose of pulling the motor into synchronism when the generator 1 is being driven by the turbine at a reduced speed at starting or as the motor is being reversed. When the lever 18 is in the position 18ᵇ, the voltage supplied by the booster to the field 8 of the generator 1 is in the opposite direction and the generator field is reduced to its minimum, say 50% of its normal value. This arrangement for varying the generator field is well known.

The reversing switches 6 and 7 are governed or operated by coils 21 and 22, respectively, said coils being connected to contacts 24 and 25, with the one or the other of which the reversing lever 27 is adapted to make contact to connect either coil to the lead 28, as desired.

The braking resistances for the generator 1 are indicated at 29 and are adapted to be connected across the leads 4 by means of switches 30 electrically operated or controlled by a coil 31, one end of which is connected through the conductor 23 to the lead 20 of the exciter 9, while the other end of the coil 31 is connected, by means of a conductor 32, to a contact 33 on the field-control switch 15, the arrangement being such that, when the controlling lever 18 is moved beyond the right hand position 18ᵇ, the said contact 33 is connected by a second bridging contact on the lever 18 to a segment 34 connected to the lead 19 of the exciter 9. The contact 33 is also connected to one end of a relay coil 35, the other end of which is connected, by the conductor 36, to the lead 20 of the exciting generator 9. Consequently, the coils 31 and 35 are connected in parallel between contact 33 and lead 20 from the exciter 9.

When the lever 18 is thus moved to its extreme right-hand position, the field circuit of the booster is maintained, the switches 30 are closed to place the braking resistances 29 on the generator 1 and the relay 35 is energized. The relay 35 controls a circuit from the lead 19 of the exciter 9, through conductor 37, a retaining interlock 38, the relay contacts 39, conductor 40, the operating coil 41 of switches 42 in the exciting circuit of the field winding 8 and conductors 43 and 36 to the lead 20 of the exciter 9. With this arrangement, the energizing of the relay coil 35 opens the circuit of the coil 41 so that the switches 42 are opened and the generator field reduced to zero. The operation of the switches 42 also instantly closes the switch 11 to place the discharge resistance 10 across the field winding 8.

From an inspection of the drawing it will be seen that the coil 41 is energized when the lever 18 is in any intermediate position, the circuit being completed from the lead 19, conductor 37, retaining interlock 38, relay contacts 39, which are bridged as the relay coil 35 is at this time de-energized, conductors 40, 43 and 36 and lead 20. The retaining interlock 38 is arranged, by mechanical or electrical means, to close when the switches 42 in the exciting circuit of the field winding 8 are closed and to be open when the said switches are open. The coil 41 is arranged to be connected across the leads 19 and 20 of the exciting generator 9 when the lever is in the right-hand dotted-line position 18$^b$ by means of a conductor 44 connected to a contact 45 adapted to be connected to the segment 34, whereby an alternative circuit is provided for closing the switches 42 when the retaining interlock 38 is open.

The controlling lever for the steam valves is indicated at 46, and the mechanical interlock between the said lever and the field-controller switch 15 comprises a linkage system 47, 48, 49, the link 47 of which is attached to the lever 46 by means of a pin-and-slot connection 50, the arrangement being such that the lever 46 may be moved to the left, for example, to reduce the speed of the turbine without moving the field-controller lever 18, while movement of the latter to the right to reduce the generator field to the minimum amount will ensure the steam supply being reduced if the operator has failed to do so.

The voltage interlock of the reversing switch 26 comprises a notched segment 51 adapted to be engaged by a locking bolt 52 magnetically controlled by a coil 53 connected to the leads 19 and 20 of the exciting generator 9 through the conductors 28 and 23 and a switch 54. The switch 54 is normally closed by the excitation of the coil 55 which is connected by means of conductors 56 across the leads 4 of the motor 2. But, if the voltage at the terminals of the motor is reduced below a predetermined limit, the coil 55, being insufficiently energized, permits the switch 54 to open, thereby de-energizing coil 53 to permit the locking bolt 52 to release the segment 51.

The operation of the system is as follows, that is to say, assuming, for example, that the generator and motor are running normally in the forward direction and that it is desired to reverse the propeller, the steam supplied to the turbine is reduced to approximately that required for one-half speed by moving the lever 46 to the left. The lever 18 of the field-control switch 15 is then moved to the right, i. e. towards the position 18$^b$, whereby the voltage in the field winding 8 is reduced. Further movement of the lever beyond the position 18$^b$ connects the contact 33 with the segment 34 and thereby energizes both the relay coil 35 and the operating coil 31 of the switches 30 whereby the switches 42 are opened and the discharge resistance 10 inserted so that the field of the generator is reduced to zero, and the braking resistances 29 are inserted across the generator. The discharge resistance may be adjusted so that a high value will be given to the time constant of the field winding 8 and the voltage remains at a high value for a length of time sufficient, in conjunction with the braking resistance 29, to reduce the speed of the generator and turbine to about one-half of the normal.

When the voltage of the generator has fallen to zero, the relay coil 55 is de-energized and permits the reversing switch lever 27 to be moved, to the position shown in dotted lines. By this operation, the coil 21 is de-energized and the coil 22 energized so that the swiches 6 are opened and switches 7 closed and the motor connections reversed.

The lever 18 of the field-control switch 15 is now moved over towards left-hand position 18$^a$, for increasing the excitation of the generator field. During the initial movement of the lever from the extreme right-hand position, the contact 33 is disconnected from the segment 34 so that the operating coil 31 is de-energized and the switches 30 opened to cut out the braking resistances 29. At the same instant the relay coil 35 is de-energized and the contacts 39 of the circuit of the coil 41 are bridged but the coil 41 is not immediately energized owing to the fact that the retaining interlock 38 is open. The lever 18 however quickly reaches the contact 45 of the conductor 44 and connects it to the segment 34 for a sufficient time to energize the coil 41 and close the switches 42 in the energizing circuit of the field winding 8. The retaining interlock 38 then bridges its contacts and retains the circuit of the coil 41 in connection with the leads 19 and 20 of the exciting generator 9.

A further movement of the lever 18 connects the segment 17 with the resistances 16, and the continued movement gradually increases the excitation of the generator 1 until the position 18ª is reached, as hereinbefore described. The motor 2 now rotates in the reverse direction and is pulled into synchronism, this being ensured by reason of the reduction in the speed of the generator and the high excitation of its field winding 8.

When the motor is running in synchronism with the generator, the excitation of the latter is reduced to normal by moving the lever 18 of the reversing rheostat 15 to the central position. The lever 18 is preferably provided with a spring return device for this purpose. The speed of the generator may now be raised by increasing the steam supply, as desired.

It will be understood that the system and the apparatus used therein may be modified in various ways, for example, in place of the generator 9, any suitable source of direct-current supply may be employed and other modifications may be introduced without departing from the scope of the invention.

Having now particularly described our invention what we claim is:—

1. In a marine propulsion system, the combination with an alternating-current generator and an induction motor, of a field-magnet winding for said generator and means for automatically interrupting the circuit of said field winding when the voltage of said generator has been reduced to a predetermined value and for simultaneously effecting dynamic braking of said generator.

2. In a marine propulsion system, the combination with an induction driving-motor and an alternating-current generator therefor, of a field-magnet winding for said generator, a booster for controlling said winding, a dynamic-braking resistor for said generator, a transfer switch for selectively controlling said booster and said field-winding, a master switch for controlling said transfer switch and said braking resistor, and reversing means for said motor operable only at predetermined values of the voltage of said generator.

3. The combination with a synchronous generator having a field magnet winding, and a motor energized by said generator, of means for governing the energization of said winding, means for reversing said motor, and means for dynamically braking said generator, said dynamic-braking means co-operating with said governing means for decreasing the speed of said generator.

4. The combination with a turbo-generator having a field-magnet winding and a motor energized by said generator, of means comprising a rheostat for governing the energization of said winding, means governed in accordance with the operation of said rheostat for effecting dynamic braking of said generator and for controlling said turbine, and means for preventing reversal of said motor while the voltage supplied to said motor is appreciable.

5. The combination with a synchronous generator having a field-magnet winding and a motor energized by said generator, of means comprising a rheostat for governing the energization of said winding, means governed in accordance with the operation of said rheostat for effecting dynamic braking of said generator, means for reversing said motor, and means for preventing said reversing means from being operated until said first means and said braking means have reduced the voltage of said generator to a predetermined value.

In testimony whereof, we have hereunto subscribed our names this twelfth day of February, 1921.

GUSTAF ADOLF JUHLIN.
LEONARD MILLER.